Nov. 29, 1955

R. J. BRASKI ET AL 2,725,460

DEEP FAT FRYER

Filed Aug. 19, 1953

3 Sheets-Sheet 1

INVENTORS:
Raymond J. Braski and
Fred C. Schwaneke
By:- Watson D. Harbaugh Atty

Nov. 29, 1955　　　R. J. BRASKI ET AL　　　2,725,460
DEEP FAT FRYER

Filed Aug. 19, 1953　　　3 Sheets-Sheet 3

INVENTORS:
Raymond J. Braski and
Fred C. Schwaneke
By: Orton D. Harbaugh
　　Atty.

United States Patent Office 2,725,460
Patented Nov. 29, 1955

2,725,460

DEEP FAT FRYER

Raymond J. Braski and Fred C. Schwaneke, Chicago, Ill., assignors to Dormeyer Corporation, Chicago, Ill., a corporation of Illinois Application August 19, 1953, Serial No. 375,096

3 Claims. (Cl. 219—43)

This invention relates to a cooking utensil and, more particularly, to a device for cooking food in hot oils, fats, water, etc. Such cooking devices are commonly known as deep fat cookers.

An object of this invention is to provide a device that not only maintains cooking oil or fat within a few degrees of a selected temperature, but also will maintain water just below the boiling point when the device is used to poach eggs or to do other cooking of a similar nature.

Another object of the invention is to maintain a constant and well distributed heat exchange relationship between the metal body of a deep fat fryer and an electric heating element of large capacity, while eliminating the danger of flashing of the fat.

Still another object is in providing a deep fat cooker wherein the heating element is arranged with the cooking vessel so that a forced circulation of the hot fat is created that will bring the coolest portions thereof into contact with an unheated wall of the vessel which has a thermostat located thereon, with the result that the thermostat is made responsive to the coolest portions of the fat.

Yet another object is to locate a thermostat in relation to a heating element and cooking vessel in a deep fat fryer so that the thermostat acts normally to control the temperature of the fat while also being operative to provide a safety device quickly responsive to the heat of the heating element to break the electric circuit therethrough in the event that an attempt is made to operate the device without an oil or fat or other cooking liquid therein.

A further object is to provide a deep fat cooker having a novel construction enabling the use of stamped, spun or drawn metal parts and in which a conventional heating element may be employed.

Yet a further object is in providing a deep fat fryer that is simple of construction and inexpensive to fabricate and that is substantially foolproof in operation.

Additional objects and advantages will appear as the specification proceeds.

An embodiment of the invention is illustrated in the accompanying drawings, in which—

Figure 1:
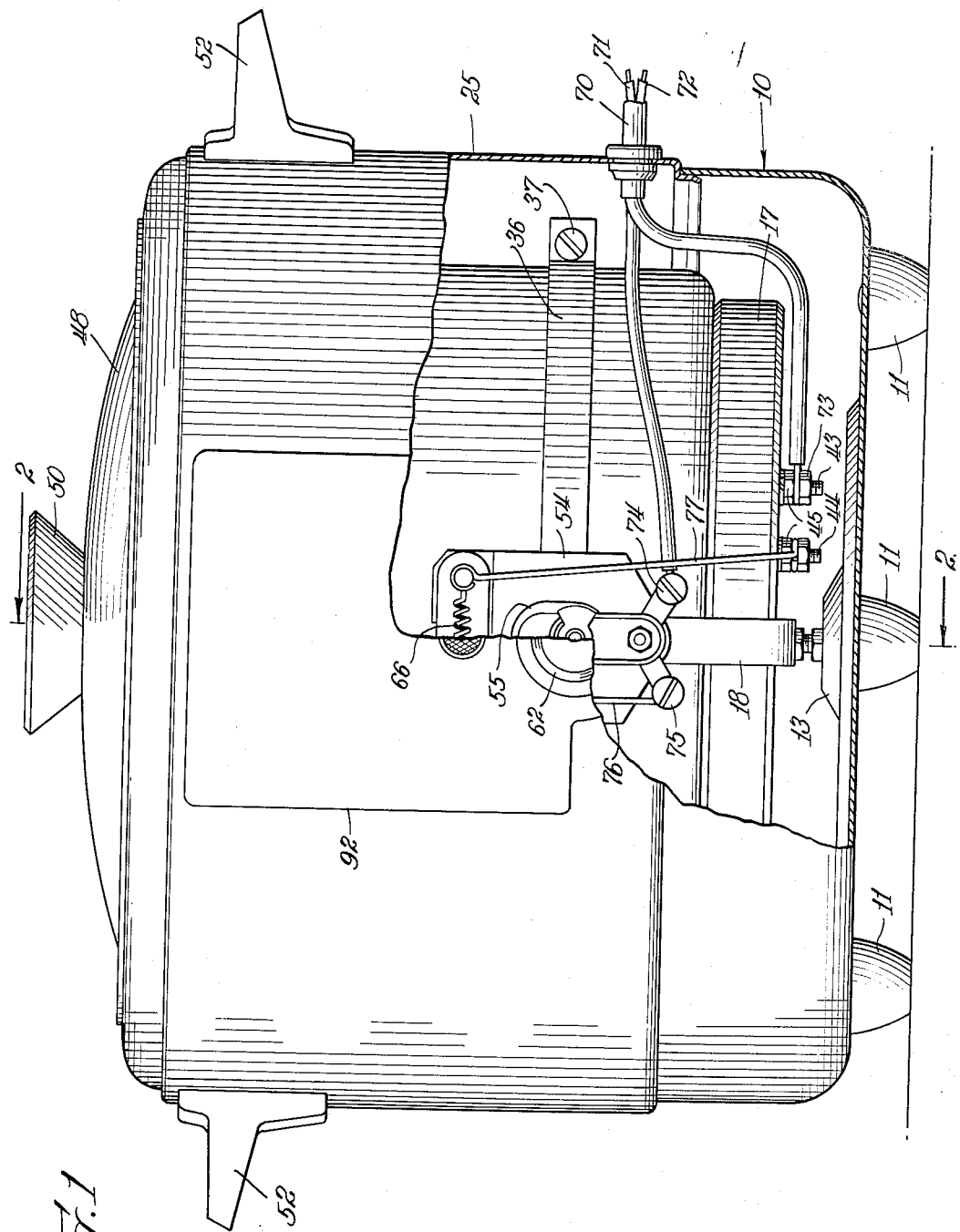
Figure 2:
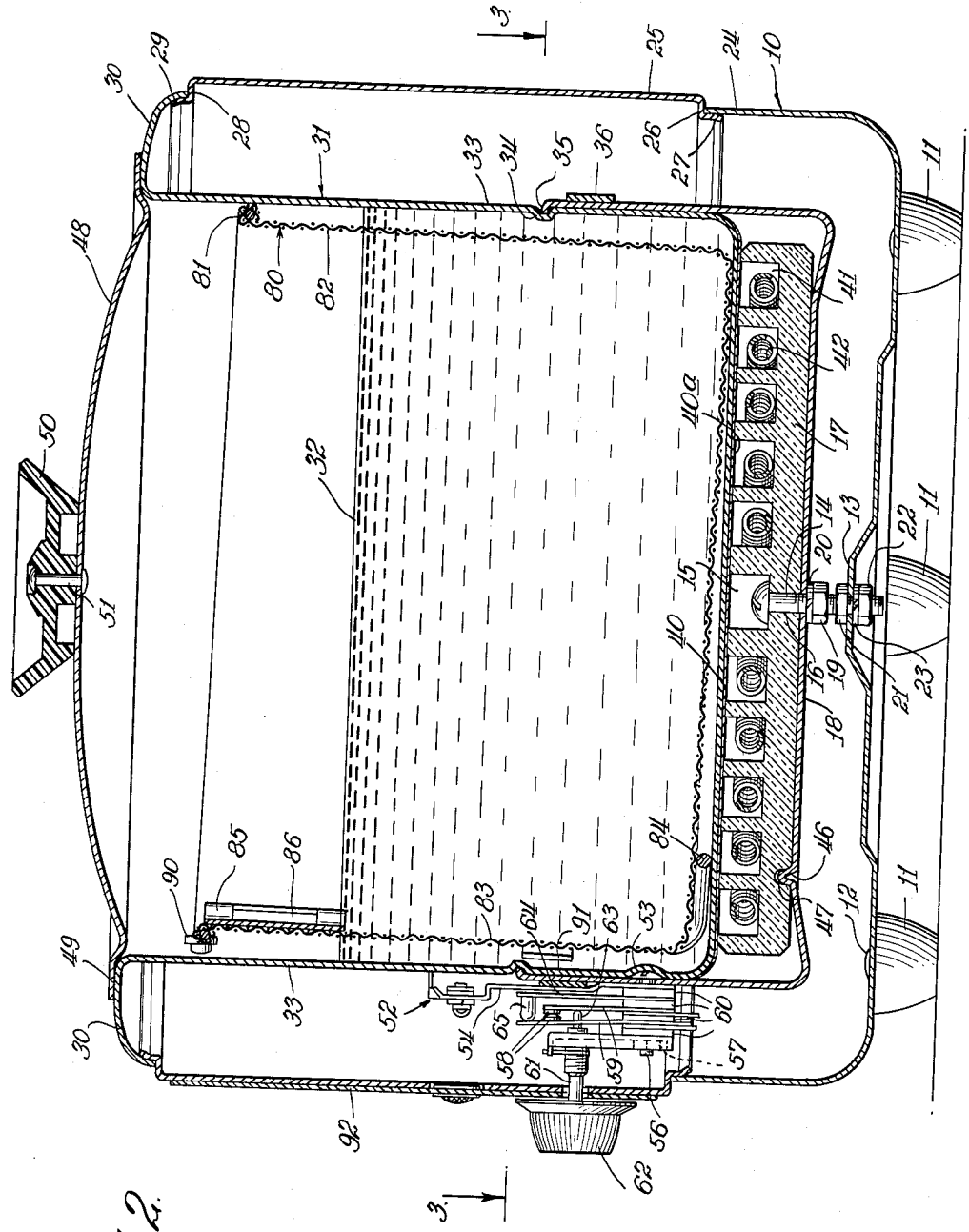
Figure 3:
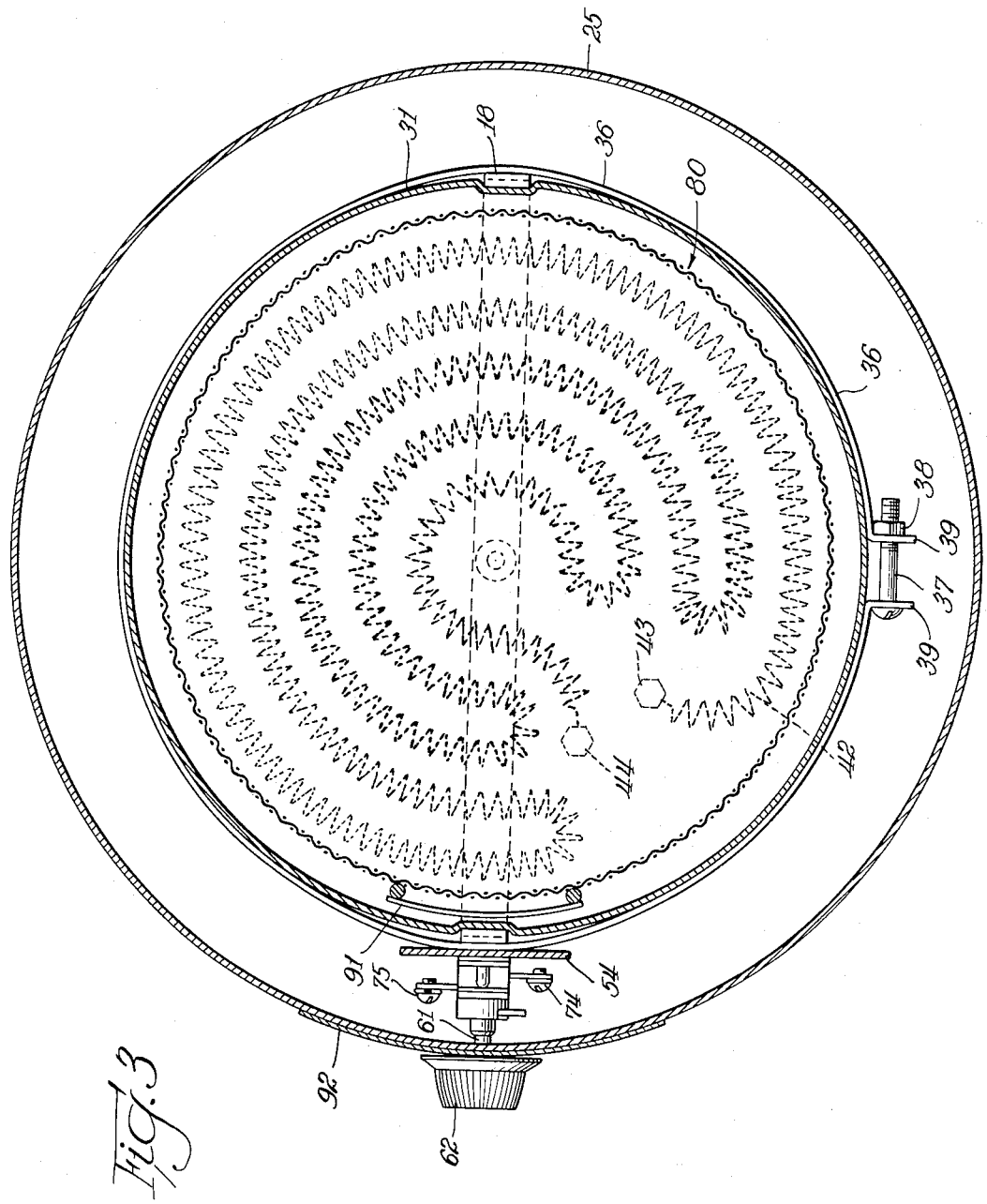

Fig. 1 is a side view in elevation of a deep fat cooker and in which parts are broken away to show portions of the interior thereof; Fig. 2 is a vertical sectional view of the deep fat cooker taken through substantially the center thereof; and Fig. 3 is a transverse sectional view taken on the line 3—3 of Fig. 2.

Reference will first be made to Fig. 2 in particular, wherein a vertical sectional view of the cooker is illustrated. The cooker comprises a base 10 equipped with a plurality of spaced-apart feet 11 which may be secured to the base by rivets 12 that extend through suitable bores provided centrally through the feet 11. The base 10 is provided centrally with a raised portion having a relatively flat horizontal surface 13 provided centrally with an aperture therethrough adapted to receive a bolt 14. The bolt 14 extends through a central recess 15 and passage 16 provided by a heating element base 17, and downwardly therefrom through a strap 18 and thence through the flat portion 13 of the base. The bolt 14 is equipped with a head that bears against an appropriate surface provided by the heating coil plate or base 17, and a nut 19 bearing against a washer 20 secures the strap 18 rigidly to the plate 17. Similarly, a pair of nuts 21 and 22, the latter of which bears against a washer 23, secure the bolt 14 to the horizontal portion 13 of the base 10. Thus it is apparent that the bolt 14 and nuts rigidly unite the base 10, strap 18, and heating element plate 17 together.

The base 10 is equipped with an upwardly-extending annular wall 24 that is rigidly secured by welding or other appropriate means to a wrapper or shell 25 equipped along the lower edge thereof with an inwardly-turned shoulder 26 and downwardly-turned flange portion 27 that engages the side wall 24 of the base 10. At its upper edge, the shell or wrapper 25 is also turned inwardly to provide the shoulder 28 and an upwardly- and inwardly-turned flange 29 that engages the end of an arcuate edge portion 30 provided by a vessel or well 31. The vessel 31 is imperforate and is adapted to receive therein a liquid, such as a hot oil or fat or water, etc., that is designated generally in the showing of Fig. 2 with the numeral 32.

Intermediate the upper and lower edges of the vessel 31, the side wall 33 thereof is equipped with a circumferential offset or detent 34 that is pressed inwardly and is adapted to receive therein the laterally-turned end portion 35 of the strap 18. To secure the strap 18 tightly to the wall 33 of the vessel 31, a circumferential strap 36 is provided and the end portions of this strap are drawn together by a bolt 37 and nut 38 that are arranged with the laterally-turned ears 39 of the strap 36.

Preferably, the vessel or well 31 is formed from aluminum although, as will be appreciated, other metal or material having high thermoconductivity may be readily employed as a substitute for aluminum. The vessel 31 may be stamped, spun or drawn and has relatively thin walls. In order to facilitate heat transfer to the fat 32 within the vessel 31, the bottom wall 40 of the vessel is preferably anodized black painted with a black paint or covered with some other black or dark-colored material that will readily absorb and transfer radiated heat therethrough. The coating of black paint is designated in the drawing with the numeral 40a. Thus even distribution of heat from all radiating surfaces is accomplished whether from the coil or the ceramic portions.

The heating element plate or base 17, as can be seen best in Fig. 3, is provided with a channel 41 therethrough that winds in snake-like coils about the plate and receives therein a continuous heating element or heating coil 42. The heating coil 42 at one end is connected to an electrical contact post 43, and at the opposite end thereof is connected to a similar post 44. The posts 43 and 44 are adapted to secure the ends of the heating coil 42 to the base 17 and this is preferably accomplished, as is illustrated in Fig. 1, by threading the posts 43 and 44 and projecting them through suitable passages in the plate 17 and then, by means of the nuts 45, tightening the posts and ends of the coil to the plate 17. Preferably, the strap 18 is equipped with a V-shaped centering guide 46 that is received within a complementary recess 47 provided in the undersurface of the heating element base 17.

The heating element base 17 should be formed from a material having good electrical insulating properties so that the turns of the heating element 42 are electrically separated from each other. A number of materials may be used suitably for this purpose, and these are well known in the art. For example, ceramics, and certain plastics may be used readily. The heating coil and heating element plate 17 are conventional and are well known in the art, and a further discussion thereof setting out in more details is believed unnecessary.

The cooking vessel should be equipped with a cover 48 that is generally arcuate in cross-section and is equipped with an annular flange 49 adapted to seat upon the arcuate end portion 30 of the vessel 31. Preferably, the cover or lid 48 is provided with a handle or knob 50 that may be secured to the cover by a rivet 51.

As is seen in Fig. 1, the deep fat fryer is equipped with handles 52 and the handles are preferably secured to the wrapper or shell 25 adjacent the upper edge thereof in any suitable manner, such as by welding or by means of screws or rivets, etc.

A thermostat and switch, designated generally with the numeral 52, is carried upon the wall 33 of the vessel 31. The specific mounting arrangement is illustrated best in Fig. 2 and it will be apparent from this illustration that the wall of the vessel 31 is provided with a recess 53 adapted to receive the head of a bolt. The bolt extends through an aperture provided in the strap 18 which is aligned with the recess 53. The switch 52 is carried on a mounting plate 54 having a window 55 therethrough, as is seen best in Fig. 1. The window 55 determines the area of the wall 33 of the vessel 31 which is effective upon the bimetal strip of the thermostat in the radiation of heat from the vessel wall to the thermostat. The mounting plate 54 is secured to the wall of the vessel 31 by a bolt 56 and nut 57 which are also effective to unite the various elements of the switch and thermostat, as will be subsequently described.

The thermostat comprises two electrical make and break contacts 58 carried by leaf springs 59 clamped together at their base upon the bolt 56, and with electrical insulating washers 60 between the springs. The leaf springs normally urge the contacts to make contact, but one of them is adjustably moved away from the other by a hand set control shaft 61 carrying on the end thereof a dial knob 62 having temperature indicia thereon and a dielectric thrust pin 63 engaging the spring at the other end. The other spring is subjected to the deflection of the bimetal member 64 through an intermediate dielectric pin 65 carried by the bimetal strip.

In one position of the dial, the first spring and contact are depressed inwardly far enough to separate the two contact members under all possible conditions, and this position is utilized as the "off" position. When the dial is turned to any other predetermined position registered thereon in temperature readings, the two contacts are permitted to come together as an initial or resting position to close a circuit which includes in series therewith a glow coil 66 mounted above the thermostat.

As will be seen from the drawings (the glow coil is illustrated best in Fig. 1), the glow coil 66 is located just above the upper end of the bimetal member and is disposed where its radiation is mainly edgewise to the bimetal member, but where its heat effect is essentially confined to the upper portion of the bimetal while the main part of the bimetal is exposed to a window-controlled breastwise radiation of heat from the wall 33 of the vessel or well 31. The base portion of the bimetal member is shielded from the wall 33 and receives little, if any, radiation from the glow coil 66. Its sensible heat is essentially that which is conducted to it through the stud or bolt 56, the sleeve rivet, and the intermediate metal elements.

As the temperature of the vessel 31 mounts when the contacts 58 are closed, the temperature will approach the temperature set for the vessel by the dial but in addition to heat conducted to it through the stud or bolt, and the heat radiation from the wall of the vessel, the thermostat receives radiated heat from the glow coil whose heat is much higher than that of the vessel wall. This higher heat effect gives an anticipating action to the thermostat. The sum of these three heats causes the thermostat to break contact before the desired temperature is reached in the vessel and after the current is cut off the higher heat which has been concentrated in the heater itself and not yet dissipated, is conducted to the surrounding wall area of the vessel, thereby carrying the temperature thereof up to the desired temperature.

When the current is cut off by the thermostat opening of the contacts 58, the glow coil 66 cools off and its contribution of radiated heat is terminated. The effective cooling of the bimetal will be accelerated ahead of that of the vessel and vessel contents, whereupon the heater is again turned on before the temperature of the vessel falls appreciably from heat loss due to cooking or radiation. This anticipating action of the thermostat is superposed upon the normalizing heat radiation effect which is continually present because of the aperture-controlled radiation from the vessel wall, and the heat conduction through the mounting post and sleeve. Thus, over the main upper portion of its body, the bimetal member is steadily exposed to radiated heat from the vessel; the mounting end absorbs only heat conducted through it remotely from the nearest portions of the heater, which absorbed heat comes from two limited concentrating areas at the inner bottom corners; and the free end of the bimetal is exposed to a widely varying heat radiation effect. Flexing in the bimetal adjacent the mounting stud accomplishes wide movement of the contact driven thereby, whereas bending near the free end has a minimized effect, thus making it possible to employ a rugged glow coil element at this point for that purpose without delicate adjustment, tolerances or operation.

As is illustrated best in Fig. 1, electric power for the deep fat cooker is supplied through a cord 70 having the customary two leads 71 and 72 therein. The lead 72 is connected to the post 45 and is secured thereto by a nut 73. Similarly, the lead 71 is connected to terminal 74 of the thermostat switch, and the circuit to the heating coil is completed through the switch, terminal 75 thereof, lead 76 that connects terminal 75 and one end of the glow coil 66, and from the opposite end of glow coil 66 through lead 77 to post 45.

A basket 80 is also provided with the deep fat fryer and it is annular in the specific illustration given, and is adapted to be received within the interior of the vessel 31. The basket 80 carries the usual reinforcing rods 81 and 82, and supported thereon is the wire mesh basket portion 83. Adjacent one end of the basket a reinforcing rod 84 is turned laterally and extends under the lower surface of the basket portion 83 so that the basket is inclined slightly or is angularly disposed when received upon the bottom wall of the vessel 31. In other respects the basket is conventional and preferably is tin dipped after fabrication. The reinforcing rods may be secured together by welding or otherwise, and similarly, the wire mesh may be tacked to the reinforcing rods at appropriate points.

Adjacent the upper edge thereof, the basket 80 is equipped with a handle-receiving plate 85 equipped with spaced recesses 86 therein adapted to receive the spaced legs of a wire handle. The handle is not shown since it forms no part of this invention and is conventional and well known in the art. The plate 85 is similarly well known in the art, and a further description in detail will not, therefore, be given. A specific showing of the handle and plate 85, etc. may be found in our Patent No. 2,597,695.

It is desirable to drain the fat or oil from the contents of the basket 80 after cooking has been completed and this is best accomplished by supporting the basket at an eleavtion above that of the fat or oil 32 within the vessel. This we accomplish by equipping the wall 33 adjacent the upper edge thereof with a pair of spaced rivets 90 adapted to be received within spaced recesses provided by support plate 91 carried on the side wall of the basket 80. The basket is simply raised to a position above the oil 32 and the recesses of the plate 91 slipped about the spaced studs or rivet heads 90 and the basket will be supported in such a raised position to permit the grease and oil, etc. to drain from the contents of the basket.

In operation of the structure, the plug carried by the cord 70 is inserted into an appropriate electrical outlet and the interior of the vessel 31 is filled with an appropriate quantity of fat or oil, etc. The knob of the switch 52 is turned in the appropriate direction to close the contacts 58 and, at the same time, the knob may be turned to a position indicated by the indicia plate 92 that represents the desired cooking temperature. Current flows through the switch and through the heating coil 42, and the contents of the vessel 31 are heated through conduction of heat from the coil 42 and through the lower wall 40 of the vessel 31. The coating of black paint 40a upon the wall 40 facilitates the transfer of heat therethrough.

As heat is transferred to the interior of the vessel 31, the oil or fat therein begins to circulate in a path indicated by the arrows in Fig. 2. The hot oil or fat tends to rise centrally within the vessel and circulates upwardly and outwardly and the coolest portions of the oil travel downwardly along the side wall 33 of the vessel 31. As the entire contents of the vessel 31 heat, the temperature along the side wall 33 thereof increases and when the preselected temperature is reached, the bimetallic strip causes the contacts 58 of the thermostat switch to open, as has been hereinbefore set out in detail.

It is noted that in the circulation of oil within the vessel, the hottest portions of the oil travel upwardly toward the interior of the vessel, while the coolest portions of the oil travel downwardly and along the cold wall of the vessel 31. Thus the thermostat is not responsive to the hottest portions of the circulating oil, but only the coolest portions thereof, and this tends to maintain a uniform temperature within the vessel and a temperature that is very close to the preselected cooking temperature.

The specific arrangement of the heating element, cooking vessel, and switch, enables the thermostat switch to function as a safety control as well as a means for maintaining the temperature of the oil within the vessel 31 at a preselected value. For instance, if an attempt is made to operate the deep fat cooker without oil or some other material being first placed within the vessel 31, the bottom wall 40 of the vessel is quickly heated since it is in close thermal contact with the coil 42. The vessel 31 being formed of a material such as aluminum that readily conducts heat, the heat assumed by the wall 40 of the vessel is quickly transferred upwardly along the wall 33 thereof where it is transferred to the bimetallic strip through the strap 18, bolt 56, etc. The bimetallic strip is thus quickly heated and is operative to break the contacts 58 before damage can occur to the heating coil or other elements of the deep fat fryer.

It is noted that the strap 18 is in contact through substantially its entire horizontal length with the heating element plate 17. In the event that the vessel 31 does not have oil or fat or some other cooking medium therein, the base or plate 17 will be heated excessively by the coil 42 and the heat present in the plate 17 will be transferred through the strap 18 and upwardly to the thermostat 54. Not only, then, will the thermostat be responsive to heat conducted through the walls of the vessel 31, but it will also be responsive to heat conducted thereto through the strap 18. Thus the thermostat will be quickly responsive to the heat provided by the coil 42 and will be operative to quickly break the circuit therethrough.

A conventional heating coil and mounting plate therefor may be used in this construction, and all of the parts, including the vessel 31, may be stamped or drawn. It is therefore possible to construct a simple deep fat fryer and one that is inexpensive to fabricate. In addition, the operation of the cooker is substantially foolproof and the thermostat functioning as a safety control forestalls damages to the fryer in the event of misuse thereof.

While in the foregoing specification an embodiment of the invention has been set out in considerable detail for purposes of illustration, it will be apparent to those skilled in the art that considerable deviation from these details may be made without departing from the spirit and principles of the invention.

We claim:

1. In a cooking utensil the combination of a thin walled vessel of high heat conductivity having offsets defining shoulders on the outer surface thereof, a ceramic base below the bottom of the vessel and having a recess in its upper space, a heating element supported in said recess, strap means engaging the bottom wall of said ceramic base in rigidly supported relationship to hold heating element in position to radiate heat to said bottom of the vessel, said strap means having upwardly extending portions offset over a portion of their length towards the sides of said vessel to engage said shoulders, a second means tightly engaging said end portions to hold said offsets thereon in engagement with said shoulders, and a thermostat unit spaced from said heating element and located on the side wall of the vessel including a bolt securing the cooperating elements of the thermostat unit together and extending through one of said means with the head of said bolt pressed into heat exchange contact with the wall of the vessel between such means and the wall, and electrical circuit means for energizing said heating element including said thermostat unit.

2. The combination called for in claim 1 in which the bottom of the vessel is blackened on the side next to the heating element and the heating element is spaced therefrom so that there is an air space between the heating element and the bottom of the vessel through which heat is transferred by radiation with substantially even distribution of heat from all radiating surfaces of the heating element and ceramic base.

3. The combination called for in claim 2 in which the means through which the bolt extends is the strap means whereby heat absorbed by said strap means from said ceramic base is conducted to said bolt and thermostat unit through the strap means as well as through the wall of the vessel.

References Cited in the file of this patent

UNITED STATES PATENTS

| | | |
|---|---|---|
| 2,025,302 | Olds | Dec. 24, 1935 |
| 2,194,117 | Graham | Mar. 19, 1940 |
| 2,400,735 | Bradford | May 21, 1946 |
| 2,593,392 | Budlane | Apr. 15, 1952 |
| 2,597,695 | Braski | May 20, 1952 |